United States Patent
Hornbeck

[15] 3,656,583
[45] Apr. 18, 1972

[54] METHOD AND APPARATUS FOR PRODUCING A TORQUE LOAD ON A SHAFT

[72] Inventor: Clarence J. Hornbeck, Wescosville, Pa.
[73] Assignee: Air Products and Chemicals, Inc., Allentown, Pa.
[22] Filed: Sept. 2, 1969
[21] Appl. No.: 854,607

[52] U.S. Cl. .................. 184/6.11, 60/39.18 C, 415/18, 415/219
[51] Int. Cl. ...................................................... F16n 1/00
[58] Field of Search .............. 60/39.18 C; 415/55, 112, 111, 415/116, 110, 175, 19, 18, 219; 62/402, 38; 184/6 TS; 188/87, 90 A; 239/222.11

[56] References Cited

UNITED STATES PATENTS

| | | |
|---|---|---|
| 810,955 | 1/1906 | Lund ............................. 415/18 |
| 1,240,683 | 9/1917 | Curtiss ........................... 415/219 |
| 1,516,095 | 11/1924 | Haeberlein ....................... 415/18 |
| 2,182,076 | 12/1939 | Elmer ............................. 188/90 |
| 2,420,360 | 5/1947 | Deming .......................... 188/90 X |
| 2,721,456 | 10/1955 | Whitney, Jr. et al. ............. 62/402 |
| 2,826,273 | 3/1958 | Mitchell ......................... 188/87 |
| 2,851,863 | 9/1958 | Theed ............................ 60/39.18 C |
| 3,211,396 | 10/1965 | McQuillen ...................... 188/90 X |
| 3,261,168 | 7/1966 | Ruhemann et al. ............... 62/38 X |

*Primary Examiner*—Manuel A. Antonakas
*Attorney*—Ronald B. Sherer, James C. Simmons and B. Max Klevit

[57] ABSTRACT

A method and apparatus for creating a work load on a driven shaft such as the shaft of a turbine used to liquefy gas by expansion. The load is created by impinging a jet of a viscous fluid on the inner surface of a receptacle provided on the shaft so that as the shaft rotates the viscous fluid is expelled from the receptacle at an increased level of kinetic energy. Varying the rate of flow of the viscous fluid varies the load on the shaft.

10 Claims, 2 Drawing Figures

CLARENCE J. HORNBECK
INVENTOR.

James C. Simmons
ATTORNEY 3,656,583

METHOD AND APPARATUS FOR PRODUCING A TORQUE LOAD ON A SHAFT

BACKGROUND OF THE INVENTION

This invention pertains to a method and apparatus employing a viscous fluid to create a load on a rotating shaft. The invention is most directly applicable to shafts in turbines which are used to cool gases by expansion.

A turbine to which the invention pertains is illustrated by U.S. Pat. No. 2,941,378 wherein the patentee discloses a turbine for cooling a gas by expansion. The input gas comes from a compressor to the turbine to be expanded with the expansion resulting in cooling of the gas. Heat removal from the gas is accomplished by the flowing gas performing work on the turbine wheel. The work is accomplished by placing a load on the shaft for the gas to work against. The above patent discloses one method of loading such a turbine shaft using a large brake body mounted on the shaft. The brake body rotates in a viscous fluid and is also provided with a contact brake ring to increase the load on the shaft.

Other types of loads can be created by using the shaft to run a cooling pump, electrical generators, or other similar devices.

The present invention overcomes many of the inherent problems associated with vaned pumps and other loading devices in that the apparatus of the present invention contains no parts that will wear. Power variation is simple and the adjustable range is near the theoretical limit.

There is no chance of cavitation damage since there are no vanes in the pump. The apparatus of the invention is readily fabricated, and the safe speed of operation can be readily predicted.

SUMMARY OF THE INVENTION

The invention comprises impinging a stream of a viscous fluid in a cup-shaped receptacle provided on the end of the rotating shaft. The receptacle is wetted only on its internal surfaces by the viscous fluid and otherwise rotates in an environment of gas. This minimizes uncontrolled losses. Rotation of the shaft causes the viscous fluid to spread out along the inner surface of the receptacle and eventually to be expelled therefrom at an increased level of kinetic energy. Increasing of the kinetic energy of the viscous fluid provides a load on the shaft. The load can be varied by adjusting the flow of the viscous fluid impinged on the bottom of the receptacle. The viscosity of the fluid is the operative mechanism for increasing the rotation and hence the kinetic energy of the fluid prior to being expelled from the receptacle. The viscous fluid can be recirculated through a suitable cooler and pump so that a closed system can be achieved.

Therefore, it is the primary object of the invention to provide a means for producing a torque load on a rotating shaft.

It is another object of the invention to produce a load on a rotating shaft by increasing the kinetic energy level of a viscous fluid.

It is still another object of the invention to produce a load on a rotating shaft by causing a stream of viscous fluid to flow against a receptacle provided on the rotating shaft.

It is yet another object of the invention to provide a method and apparatus for producing a load on the shaft of a turbine used to liquefy gas by expansion.

DETAILED DESCRIPTION OF THE PREFERRED EMBODIMENT

Figure 1:
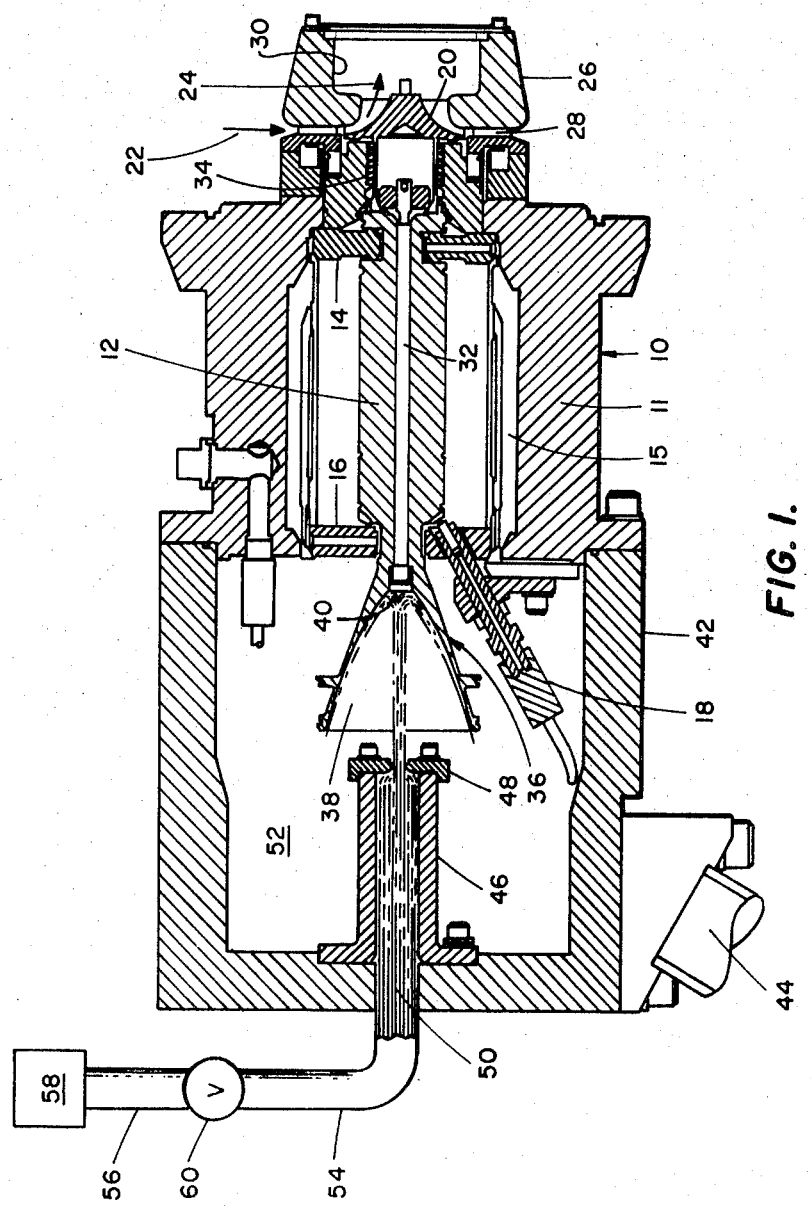
FIG. 1 is a cross sectional view of an expansion turbine employing the device of the instant invention.

Referring to FIG. 1 there is shown an expander or expansion turbine 10 employing the device of the present invention. The expander consists of a casing 11 within which is mounted a shaft 12; the shaft 12 is supporting by bearings 14 and 16 and associated with the bearings 14 and 16 is means 18 for continuously providing a lubricant to the bearings. On one end of the shaft 12 there is mounted a turbine wheel 20. The turbine wheel 20 contains a series of blades for receiving the flow of gas designated at the incoming location by the arrow 22 and the exit location by the arrow 24. There is provided a secondary housing or cover 26 which defines the inlet passage 28, and exit passage 30 for the gas. The inlet passage 28 is provided with a series of stationery blades (not shown) to deflect the flow of gas so as to facilitate rotation of the turbine wheel 20. The wheel 20 is connected to the shaft 12 as by a bolt 32 disposed within a longitudinal bore provided in the shaft 12.

The gas passage 28 is isolated from the bearing 14 and the interior chamber 15 of the casing 11 by a labyrinth packing 34. Such packings are well known to those familiar with turbines used to liquefy gases by expansion.

At the end of the shaft 12, opposite the wheel 20, there is formed a receptacle 36. The receptacle or cup 36, has an interior surface 38 that is in the shape resembling a parabola when viewed in cross section. The slope of surface 38 can be varied to any desired characteristics as long as the viscous fluid flow, as is hereinafter more fully disclosed, proceeds without hydraulic instabilities. It has been found that a slope of 3 to 1 on the interior surface of the cup lip is satisfactory. The bottom of the cup 36 is provided with a cover or plug 40 which covers the end of bolt 12; this is included to provide as smooth surface for impingement of the viscous fluid. Surrounding the cup 36 and enclosing this end of the expander is a second housing or casing 42. The casing 42 acts as a lubricating fluid reservoir and has a discharge conduit 44 for collecting the viscous fluid and small amount of lubricating oil with any dissolved gas for separation and recirculation of the lubricating fluid. Within casing 42 is a cylinder 46 for directing a stream of viscous fluid toward the bottom (plug 40) of the cup 36. The cylinder 46 includes a nozzle device 48 which preferably can be changed to provide different flow speeds for the viscous fluid. The cylinder 46 is connected through casing 42 and conduits 54, 56 to a viscous fluid pumping means 58. Between fluid pumping means 58 and casing 42 there is a control device shown as a valve 60. The fluid pumping means can be an ordinary lubricating pump. The viscous fluid stream shown as 50 can be lubricating oil similar to that used to lubricate bearings 14 and 16.

In operation a gas to be cooled, such as helium from an external compressor, is admitted to the turbine wheel 20 via passage 28 in the direction shown by arrow 22. The gas passes along vanes on wheel 20 and outwardly from the wheel 20 into a larger passage 30 in the direction shown by arrow 24. The gas is thus expanded by the turbine wheel, e.g. the gas enters at high pressure and high temperature and exits at low pressure and low temperature. The flow of gas causes the turbine wheel to rotate which in turn causes shaft 12 and the receptacle or cup 36 to rotate. In order to extract heat from the gas the shaft 12 must be caused to do work, therefore as the shaft rotates, viscous fluid 50 is forced against the bottom 40 of the cup 36. The rotation of the cup 36 causes the viscous fluid 50 to spread along the walls of the cup and eventually outwardly therefrom into the interior surface 52 of casing 42. The fact that the fluid is viscous enables it to be brought up to near the speed of rotation of the receptacle 36. This increases the kinetic energy of the fluid and hence absorbs power or creates a load on the shaft against which the flowing gas works. Therefore, the heat can be extracted from the incoming gas causing a reduction of the temperature of the incoming gas. The device is of course ideally suited to liquefaction of a gas such as helium.

It should be pointed out that the gas temperature and pressure entering the turbine at 28 are varying so that the torque on the shaft should be variable in order to extract the most heat from the incoming gas. The torque can be varied by varying the flow of the viscous fluid 50 using the valve 60 between the cylinder 46 and the pump 58. The diameter of oil jet 48 can be varied if desired, without materially affecting the performance of the cup loader.

Figure 2:
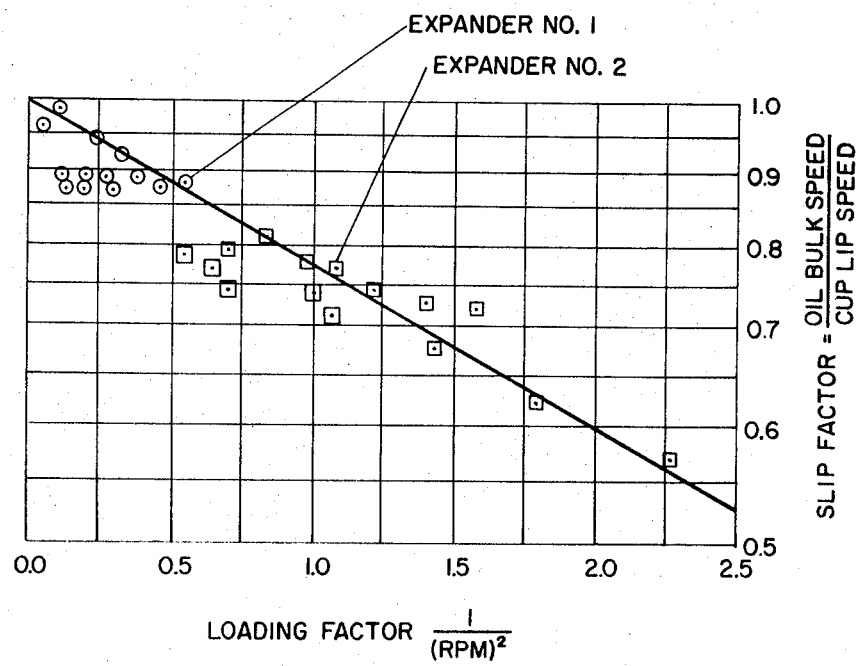
FIG. 2 is a plot of load factor vs. slip factor for devices constructed according to the instant invention.

Shown in FIG. 2 is a semi-logarithmic plot of loading factor vs. slip factor for two expanders built according to this invention. The supply of viscous fluid 50 was held at constant temperature and viscosity. The slip factor is taken as the ratio of the bulk tangential velocity of the viscous fluid to the cone tangential velocity at the cone exit as calculated from measured power absorbed and nozzle (48) flow rate. The loading factor is related to the reciprocal of the square of the revolutions per minute (rpm) of the shaft. Referring to FIG. 2 it is apparent that at a slip factor of 0.9 the bulk of the viscous fluid is brought to 90 percent of the tip speed of the cup which is about normal for this type of device. It is also as good a slip factor as is usually obtained with well-designed centrifugal compressors containing radial-vaned wheels. Therefore, it is a correct measure of the effectiveness of the device according to the present invention, and demonstrates that such a device is exceptional. It also demonstrates that the power produced is near the theoretical limit.

The preferred viscous fluid useable with the device of this invention is the lubricating oil used to lubricate bearings 14 and 16. Use of the lubricating oil as the viscous fluid 50 simplifies the expander in that only one circulation system for the oil is required. However, other viscous fluids can be used in other applications of the instant invention.

The device of the instant invention is ideally suited for small systems where the horse power generated by the turbine wheel doing work can be economically thrown away. The system is a significant improvement over known devices because the rotor dynamics are not upset or disturbed by introducing an additional radial constraint such as found when using journal bearings or the like that function by shearing the viscous fluid against a solid surface. The overall system has negligable non-adjustable power absorption.

The apparatus of the present invention is readily fabricated by machining. It is most easily constructed by machining with a tracer lathe.

It is possible to predict the safe speed of operation for this device and a preliminary confirmation of this can be accomplished by checking the hardness of the shaft which indicates strength of the shaft.

Fatigue failure of the cup is not likely, as might be expected, since it is believed the viscous fluid (oil) damps out any vibrations in the cup loader. Tests did not reveal any sound ("ringing of the bell") or fatigue cracks in the loader which would confirm this minimization of fatigue failure.

Actual tests have also shown that the noise level of the cup loader was less than that of the expander and was inaudible over the lubricator pump motor.

Having thus described the invention by reference to a particular embodiment, I wish it understood that it is to be limited in scope only in accord with the appended claims.

I claim:

1. A device creating a torque load on a rotating shaft comprising:
   a receptacle on one end of said rotatable shaft, said receptacle having smooth diverging walls opening outwardly of said shaft and with circular cross section;
   said receptacle rotatable with said shaft;
   means for providing a stream of viscous fluid directed to the apex of said receptacle; and
   means for varying the rate of flow of the viscous fluid; whereby, the impingement of the viscous fluid against the apex of the receptacle and movement of the fluid over the surface of the receptacle and outwardly thereof is the operative loading mechanism.

2. A device according to claim 1 wherein the means for providing the stream of viscous fluid comprises a nozzle and pump.

3. A device according to claim 1 wherein the viscous fluid flow is varied by a valve between the pump and the nozzle.

4. A device according to claim 3 wherein the viscous fluid is lubricating oil.

5. In a turbine for cooling a gas by expansion of the type comprising a casing, a rotor in said casing, a shaft with one end connected with said rotor bearings to support said shaft, means for lubricating said bearings, packing means disposed between said rotor and the shaft bearings, and means to lubricate said bearings, the improvement which comprises:
   means on the end of the shaft opposite to the end connected with the rotor adapted to rotate with said shaft and receive a viscous fluid stream impinged thereon during rotation of the shaft so that a load is created on the shaft of said turbine by bringing the viscous fluid up to a speed of rotation whereby it leaves the end of the shaft at an increased level of kinetic energy.

6. A turbine according to claim 5 wherein the loading means comprises a cup having a generally parabolic longitudinal cross section disposed on one end of the shaft.

7. A turbine according to claim 6 wherein the cup wall at the lip has a slope of about 3 to 1.

8. A turbine according to claim 6 wherein the viscous fluid is impinged on the interior surface of the cup by a variable nozzle connected to a pumping device.

9. A turbine according to claim 4 wherein the viscous fluid is lubricating oil.

10. A method of producing a torque load on a rotating shaft comprising the steps of:
    providing a receptacle on said shaft to receive a stream of viscous fluid;
    rotating said shaft;
    supplying said stream of viscous fluid against the apex of to said receptacle so that the viscous fluid spreads outwardly along the walls of said receptacle; and
    adjusting the flow of said stream of said viscous fluid to produce the desired load on said shaft.

* * * * *